United States Patent Office 3,264,071
Patented August 2, 1966

3,264,071
BIS(AMMONIO) DECABORANE
William V. Hough, Valencia, Pa., assignor to Callery Chemical Company, Pittsburgh, Pa., a corporation of Pennsylvania
No Drawing. Filed Dec. 21, 1959, Ser. No. 863,048
3 Claims. (Cl. 23—358)

This invention relates to a new ammonia decaborane compound, bis(ammonio)decaborane, and to a method for its preparation.

Decaborane, $B_{10}H_{14}$, is a solid, volatile hydride of boron. Although it has been known for some years and is produced in considerable amounts when either diborane or tetraborane is pyrolyzed, its chemistry is still only imperfectly understood. Of late, increasing interest in decaborane and compounds derived from decaborane has resulted from the discovery of several decaborane derivatives having varied and unusual physical and chemical properties.

It is an object of this invention to provide a new ammonia derivative of decaborane, bis(ammonio)decaborane.

Another object is to provide a new derivative of decaborane having physical and chemical properties which make it useful as a fuel component as well as in several other applications.

Still another object is to provide a method for producing the above new compound, bis(ammonio)decaborane.

Other objects will become apparent from time to time hereinafter.

This invention is based upon my discovery that the reaction of ammonia with decaborane in the presence of a lower alkyl ether produces bis(ammonio)decaborane, $(NH_3)_2B_{10}H_{12}$, in accordance with the following equation:

$$B_{10}H_{14} + 2NH_3 \rightarrow (NH_3)_2B_{10}H_{12} + H_2$$

The reaction proceeds in this manner whenever the reactants are contacted in the presence of the ether at ordinary ambient temperatures, i.e., about 25 to 30° C. Thus, elevated temperatures are not necessary, although moderate heating can be used if desired.

The reaction appears to commence as soon as the reactants are mixed at a temperature approximating room temperature; that is, there is no known induction period prior to the start of the reaction. However, the rate of the reaction is relatively slow, so that vigorous agitation, so as to insure adequate mixing, and reaction periods of several hours have been used in order to achieve good yields.

A lower alkyl ether is used as a reaction medium and is believed to cause the reaction to take place as indicated above. Ethyl ether is the most common lower alkyl ether and is generally used in carrying out my method, but other such ethers, e.g., propyl ether, can also be used.

The molar ratio of the reactants used does not appear to be critical, in that some bis(ammonio)decaborane is obtained even when relatively low ratios of ammonia to decaborane are used. However, yields of the desired product are low in such cases and it is preferred to use a ratio of at least about 1.5 mols of ammonia for each mol of decaborane.

The following examples, which are to be considered as illustrative only, will serve to further demonstrate the method and practice of my invention in several of its embodiments.

Example 1.—A round-bottomed flask was charged with 4.9 grams of purified decaborane, $B_{10}H_{14}$, and 25 milliliters of ethyl ether. After the flask had been cooled and evacuated, the contents were warmed to room temperature, 0.996 gram of ammonia was passed into the solution over a period of 30 minutes, and the mixture was stirred for about 8 hours. The reaction mixture was filtered and washed and a white solid which had precipitated during the reaction was recovered. This product weighed 3.5 grams and upon analysis was found to contain 67.5% boron and 18.1% nitrogen, compared to the theoretical values of 70.1% boron and 18.2% nitrogen in bis(ammonio)decaborane, $(NH_3)_2B_{10}H_{12}$. The identification of the product was confirmed through infra-red and X-ray analyses, in addition to reaction stoichiometry and chemical analysis.

Example 2.—A glass reaction tube was charged with 1.27 millimols of decaborane, 2.28 millimols of ammonia and 15.2 millimols of ethyl ether. After the reactants had been condensed into the tube, it was sealed, placed in a shaker, thereby agitating the reaction mixture, and warmed to room temperature (about 25 to 30° C.). After about 40 hours, the tube was opened and its contents were analyzed. No ammonia remained and 0.92 millimol of hydrogen was obtained. No decaborane was recovered, even after heating the reaction product to 75° C. for several hours. The reaction stoichiometry indicated that a white precipitate which had formed was principally bis(ammonio)decaborane, $(NH_3)_2B_{10}H_{12}$, and this conclusion was confirmed by infra-red and X-ray analyses. The infra-red and X-ray spectra of this product were identical with the product obtained in Example 1 above.

Bis(ammonio)decaborane is useful as an intermediate in the synthesis of other boron compounds in which a decaborane-type structure is desired. It is also useful as a fuel, either in ordinary heating applications where it may be burned in air to heat the surroundings, or as a propellant component in formulations for use as high energy fuels in rocket or similar type engines. For example, solutions of bis(ammonio)decaborane in hydrazine are used as monopropellant compositions in rocket engines and provide advantageous impulse characteristics.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:

1. A method of producing bis(ammonio)decaborane, $(NH_3)_2B_{10}H_{12}$, which comprises reacting ammonia with decaborane at a temperature of at least about 25° C. in the presence of a lower alkyl ether in which up to about 2 mols of ammonia are used for each mol of decaborane and recovering the bis(ammonio)decaborane thus formed.

2. A method in accordance with claim 1 in which from about 1.5 to about 2 mols of ammonio are used for each mol of decaborane.

3. A method in accordance with claim 1 in which the ether is ethyl ether.

References Cited by the Examiner
UNITED STATES PATENTS
2,708,152   5/1955   Schechter _____ 23—190

OTHER REFERENCES
Adams, "Boron, Metallo-Boron Compounds and Boranes," 1964, pages 657–658.
Bagley, "A.S.T.I.A. Tech. Abstracts Bulletin," U58–15, 2529 (Oct. 1, 1958).
"Dissertation Abstracts," volume XX, No. 3, pages 879–880 (September 1959).
Hurd, "Chemistry of the Hydrides," Aug. 25, 1952, pp. 74 to 78, John Wiley.

(Other references on following page)

OTHER REFERENCES

Kodama et al., "J. Am. Chem. Soc.," vol. 79, page 1007 (1957).

Schechter, "Boron Hydrides and Related Compounds," pp. 26, 27, Second Edition, May 1954, Callery Chemical Co.

Shore, "Dissertation Abstracts," vol. 18, page 1242 (April 1958).

Sinclair et al., "U.S. Gov't Research Reports," vol. 27, No. 6, page 307 (June 14, 1957).

Stock, "Hydrides of Boron and Silicon," pages 84, 85, 123–127, Cornell University Press (1933).

Toeniskoetter, "Some Reactions of Decaborane With Electrons and Electron Pair Donors," a thesis presented to the faculty of the St. Louis University in partial fulfillment of the requirements for the degree of Doctor of Philosophy, 1958, pages 83, 84, 136.

OSCAR R. VERTIZ, *Primary Examiner.*

WILLIAM WILES, ROGER L. CAMPBELL, MAURICE A. BRINDISI, *Examiners.*

C. D. QUARFORTH, R. D. MORRIS, M. WEISSMAN, *Assistant Examiners.*